(12) United States Patent
Rotole et al.

(10) Patent No.: US 11,654,960 B2
(45) Date of Patent: May 23, 2023

(54) REAR STEERING HYDRAULIC SYSTEM

(71) Applicant: DEERE & COMPANY, Moline, IL (US)

(72) Inventors: David V. Rotole, Bloomfield, IA (US); Ryan J. Goodrich, Lawton, MI (US); Thomas D. Morrison, Bettendorf, IA (US); Andrew W. Baker, Portage, MI (US); Tyler K. Farrington, Kalamazoo, MI (US)

(73) Assignee: DEERE & COMPANY, Moline, IL (US)

( * ) Notice: Subject to any disclaimer, the term of this patent is extended or adjusted under 35 U.S.C. 154(b) by 375 days.

(21) Appl. No.: 16/860,485

(22) Filed: Apr. 28, 2020

(65) Prior Publication Data
US 2021/0331738 A1 Oct. 28, 2021

(51) Int. Cl.
*B62D 5/06* (2006.01)
*B62D 5/09* (2006.01)
*B60B 33/00* (2006.01)

(52) U.S. Cl.
CPC ............... *B62D 5/063* (2013.01); *B62D 5/09* (2013.01); *B60B 33/00* (2013.01)

(58) Field of Classification Search
None
See application file for complete search history.

(56) References Cited

U.S. PATENT DOCUMENTS

| | | | |
|---|---|---|---|
| 7,077,220 B2 | 7/2006 | Dunn et al. | |
| 8,496,256 B2 | 7/2013 | Bebernes et al. | |
| 8,925,672 B2 * | 1/2015 | Bebernes | B62D 11/005 |
| | | | 180/417 |
| 9,370,138 B2 | 6/2016 | Bebernes et al. | |
| 9,421,999 B2 | 8/2016 | Rotole et al. | |
| 9,439,341 B2 * | 9/2016 | Bebernes | B62D 6/007 |
| 9,744,986 B2 | 8/2017 | Young et al. | |
| 10,661,831 B2 | 5/2020 | Rotole | |
| 2019/0124820 A1 | 5/2019 | Dockter et al. | |
| 2021/0329824 A1 | 10/2021 | Karst et al. | |
| 2021/0331738 A1 | 10/2021 | Rotole et al. | |

* cited by examiner

*Primary Examiner* — Adam D Tissot

(57) ABSTRACT

A hydraulic system for controlling a pair of steerable caster wheels includes a left steering command valve, a right steering command valve, and a rear steering control valve. A supply pressure fluid circuit interconnects a pressure source and the rear steering control valve. A command valve supply fluid circuit interconnects the rear steering control valve with both the right steering command valve and the left steering command valve. A left side steering fluid circuit interconnects a left side actuator and the left steering command valve. A right side steering fluid circuit interconnects a right side actuator and the right steering command valve. A fluidic tie rod fluid circuit interconnects both the left side actuator and the right side actuator with the rear steering control valve. A tank return fluid circuit interconnects the rear steering control valve, the left and right steering command valves, and a tank.

19 Claims, 3 Drawing Sheets

US 11,654,960 B2

REAR STEERING HYDRAULIC SYSTEM

TECHNICAL FIELD

The disclosure generally relates to a hydraulic system for controlling a pair of steerable rear caster wheels of an agricultural machine.

BACKGROUND

Some agricultural machines, such as but not limited to self-propelled windrowers, are driven through a dual-path hydrostatic system. Speed changes are made by adjusting the speed of both front drive wheels simultaneously. Primary steering or direction changes are made by adjusting the relative speed of the front drive wheels. The rear wheels of such machines may be caster wheels to allow the machine to pivot during direction changes.

Caster wheels are typically carried by a frame of the vehicle, and are free to rotate about a generally vertical axis three hundred sixty degrees (360°). The caster wheel assembly typically includes a shaft defining an axis of rotation, a fork rigidly attached to the bottom end of the shaft, and a caster wheel coupled with the distal ends of the fork.

In order to improve steerability of such vehicles, the vehicle may be equipped with a steering system for controlling the rear caster wheels. For example, the vehicle may be equipped with a hydraulic system that actuates hydraulic cylinders to control the position of the rear caster wheels relative to their respective vertical axis about which they rotate. In order to maintain the versatility of the rear steering system of such vehicles, the rear caster wheels should be capable of rotating independently of each other in certain circumstances, such as for example, when reversing directions and/or in response to a significant lateral force.

SUMMARY

A hydraulic system for controlling a pair of steerable caster wheels of an agricultural machine is provided. The hydraulic system includes a pressure source configured to supply a flow of pressurized fluid, and a tank configured to receive and store the fluid, as well as supply the fluid to the pressure source. A left side actuator is configured to control a left rear caster wheel, and a right side actuator is configured to control a right rear caster wheel. The hydraulic system includes a valve block and a plurality of fluid circuits. The valve block includes a left steering command valve, a right steering command valve, and a rear steering control valve. A supply pressure fluid circuit interconnects the pressure source and the rear steering control valve in fluid communication. A command valve supply fluid circuit interconnects the rear steering control valve with both the right steering command valve and the left steering command valve in fluid communication. A left side steering fluid circuit interconnects the left side actuator and the left steering command valve in fluid communication. A right side steering fluid circuit interconnects the right side actuator and the right steering command valve in fluid communication. A fluidic tie rod fluid circuit interconnects both the left side actuator and the right side actuator with the rear steering control valve in fluid communication. A tank return fluid circuit interconnects the rear steering control valve, the left steering command valve, the right steering command valve, and the tank in fluid communication.

In one aspect of the disclosure, the rear steering control valve is controllable between a first state and a second state. When the rear steering control valve is disposed in the first state, the fluidic tie rod fluid circuit and the tank return fluid circuit are connected in fluid communication and the supply pressure fluid circuit and the command valve supply fluid circuit are disconnected from fluid communication. When the rear steering control valve is disposed in the second state, the fluidic tie rod fluid circuit and the tank return fluid circuit are disconnected from fluid communication and the supply pressure fluid circuit and the command valve supply fluid circuit are connected in fluid communication. The rear steering control valve is normally disposed in the first state and is controlled into the second state in response to an activation signal. In one aspect of the disclosure, the rear steering control valve is a pilot actuated position control valve.

In one aspect of the disclosure, the valve block includes a cross port pressure relief system that interconnects the left side steering fluid circuit, the right side steering fluid circuit, and the fluidic tie rod fluid circuit in fluid communication. The cross port pressure relief system includes a left side pressure relief valve and a right side pressure relief valve. The left side pressure relief valve includes a first port connected in fluid communication to the left side steering fluid circuit, and a second port connected in fluid communication to the fluidic tie rod fluid circuit. The right side pressure relief valve includes a first port connected in fluid communication to the right side steering fluid circuit, and a second port connected in fluid communication to the fluidic tie rod fluid circuit. The second port of the left side pressure relief valve and the second port of the right side pressure relief valve are connected in fluid communication. The left side pressure relief valve and the right side pressure relief valve may include cartridge valves that are disposed in the valve block.

In one aspect of the disclosure, the left side actuator includes an inboard fluid port and an outboard fluid port, and the right side actuator includes an inboard fluid port and an outboard fluid port. The left side steering fluid circuit is in fluid communication with the inboard fluid port of the left side actuator. The right side steering fluid circuit is in fluid communication with the inboard fluid port of the right side actuator. A right side line is in fluid communication with the outboard fluid port of the right side actuator and the fluidic tie rod fluid circuit. A left side line is in fluid communication with the outboard fluid port of the left side actuator and the fluidic tie rod fluid circuit. The right side line and the left side line are further connected to each other in fluid communication.

In one aspect of the disclosure, the hydraulic system includes a pilot supply fluid circuit in fluid communication with the left steering command valve, the right steering command valve, and the rear steering control valve. A pilot return fluid circuit further connects the left steering command valve, the right steering command valve, and the rear steering control valve with the tank in fluid communication. A cross-valve fluid circuit connects the left steering command valve and the right steering command valve.

The left steering command valve is a pilot actuated variable directional control valve that is moveable between a first state and a second state. The left steering command valve is configured to disconnect fluid communication between the left side steering fluid circuit and the tank return fluid circuit, connect fluid communication between the pilot return fluid circuit and the cross-valve fluid circuit, and disconnect fluid communication between the command valve supply fluid circuit and the right side steering fluid circuit when disposed in the first state. The left steering command valve is configured to connect the left side steering fluid circuit and the tank return fluid circuit in fluid communication, close fluid communication to the pilot return fluid circuit, and connect the command valve supply fluid circuit with both the right side steering fluid circuit and the cross-valve fluid circuit in fluid communication when disposed in the second state. The left steering command valve is normally disposed in the first state and is controlled into the second state in response to an activation signal.

In another aspect of the disclosure, the right steering command valve is a pilot actuated variable directional control valve moveable between a first state and a second state. The right steering command valve is configured to disconnect fluid communication between the right side steering fluid circuit and the tank return fluid circuit, connect fluid communication between the cross-valve fluid circuit and a pressure sensor fluid circuit, and disconnect fluid communication between the command valve supply fluid circuit and the left side steering fluid circuit when disposed in the first state. The right steering command valve is configured to connect the right side steering fluid circuit and the tank return fluid circuit in fluid communication, close fluid communication to the cross-valve fluid circuit, and connect the command valve supply fluid circuit with both the left side steering fluid circuit and the pressure sensor fluid circuit in fluid communication when disposed in the second state. The right steering command valve is normally disposed in the first state and is controlled into the second state in response to an activation signal.

A method of controlling a pair of steerable rear caster wheels of an agricultural machine is also provided. The method includes providing a hydraulic circuit. The hydraulic circuit includes a pressure source configured to supply a flow of pressurized fluid, and a tank that is configured to receive and store the fluid, and supply the fluid to the pressure source. The hydraulic circuit includes a left side actuator configured to control a left rear caster wheel, and a right side actuator configured to control a right rear caster wheel. A valve block includes a left steering command valve, a right steering command valve, and a rear steering control valve. A plurality of fluid circuits connects the various components of the hydraulic system. A supply pressure fluid circuit interconnects the pressure source and the rear steering control valve in fluid communication. A command valve supply fluid circuit interconnects the rear steering control valve with both the right steering command valve and the left steering command valve in fluid communication. A left side steering fluid circuit interconnects the left side actuator and the left steering command valve in fluid communication. A right side steering fluid circuit interconnects the right side actuator and the right steering command valve in fluid communication. A fluidic tie rod fluid circuit interconnects both the left side actuator and the right side actuator with the rear steering control valve in fluid communication. A tank return fluid circuit interconnects the rear steering control valve, the left steering command valve, the right steering command valve, and the tank in fluid communication. A pilot supply fluid circuit is disposed in fluid communication with the left steering command valve, the right steering command valve, and the rear steering control valve. A pilot return fluid circuit is disposed in fluid communication with the left steering command valve, the right steering command valve, the rear steering control valve, and the tank. A cross-valve fluid circuit interconnects the left steering command valve and the right steering command valve in fluid communication. A pressure sensor fluid circuit is disposed in fluid communication with the right steering command valve. The method further includes controlling the rear steering control valve into a first state. When disposed in the first state, the rear steering control valve connects the fluidic tie rod fluid circuit and the tank return fluid circuit in fluid communication, and the supply pressure fluid circuit and the command valve supply fluid circuit are disconnected from fluid communication. When disposed in the first state, the rear steering control valve is operable to provide passive control of the left rear caster wheel and the right rear caster wheel.

In one aspect of the disclosed method, each of the left steering command valve and right steering command valve are controlled into a respective second state when the rear steering control valve is disposed in its first state to provide the passive control of the left rear caster wheel and the right rear caster wheel. In one aspect of the disclosed method, while the rear steering control valve is disposed in its first state, each of the left steering command valve and right steering command valve may be controlled to one or more positions between their respective first state and their respective second state to provide proportional control of the left rear caster wheel and the right rear caster wheel respectively.

In one aspect of the disclosed method, the rear steering control valve is controlled into a second state. When the rear steering control valve is disposed in its second state, the fluidic tie rod fluid circuit and the tank return fluid circuit are disconnected from fluid communication, and the supply pressure fluid circuit and the command valve supply fluid circuit are connected in fluid communication to provide active control of the left rear caster wheel and the right rear caster wheel. Each of the left steering command valve and the right steering command valve may then be controlled into variable positions between their respective first state and their respective second state to provide active control of the left rear caster wheel and the right rear caster wheel respectively.

Accordingly, the above described hydraulic system and the method of controlling the hydraulic system enable the smooth control of the rear steering caster wheels. When the rear steering control valve is disposed in its normal position, i.e., the first state of the rear steering control valve, the left steering command valve and the right steering command valve may be positioned in their respective first state to provide passive control of the rear caster wheels, or may be proportionally controlled between their respective first state and second state to provide semi-passive control of the rear caster wheels. When the rear steering control valve is disposed in its engaged or activated state, i.e., the second state of the rear steering control valve, the left steering command valve and the right steering command valve may be controlled to provide active control of the rear caster wheels. The cross port pressure relief system allows the rear caster wheels to rotate about their respective vertical axes independent of each other in response to a significant lateral force being applied to one of the rear caster wheels, such as when striking a large rock or other object.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
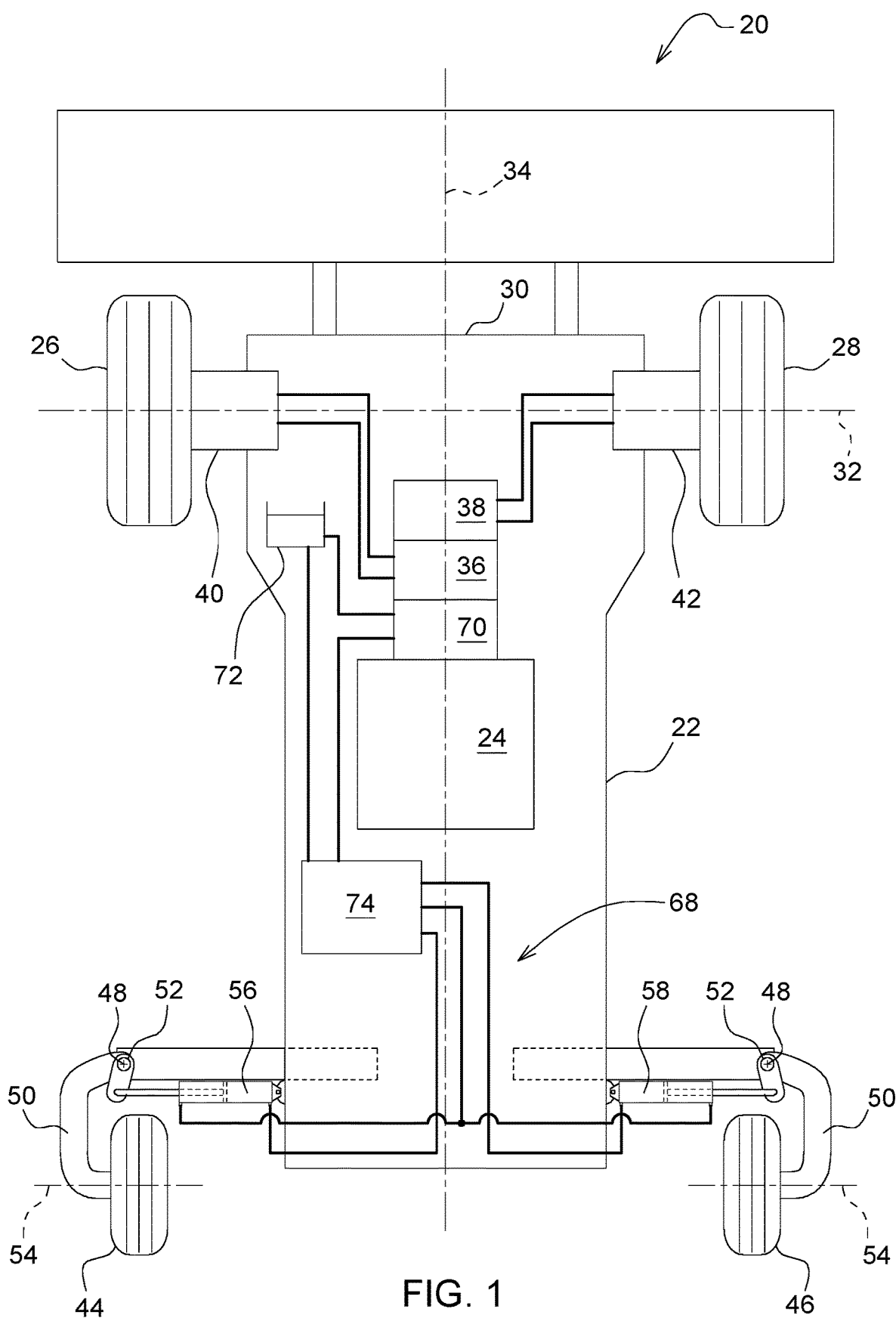
FIG. 1 is a schematic plan view of an agricultural machine.

Referring to the Figures, wherein like numerals indicate like parts throughout the several views, an agricultural machine is generally shown at 20 in FIG. 1. The example embodiment of the agricultural machine 20 shown in FIG. 1 includes, but is not limited to, a self-propelled windrower. However, it should be appreciated that the teachings of this disclosure may be applied to machines other than the example windrower depicted in FIG. 1.

Referring to FIG. 1, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22.

A first drive pump 36 and a second drive pump 38 are coupled to and driven by the prime mover 24. The first drive pump 36 supplies pressurized fluid to a first hydraulic motor 40. The first hydraulic motor 40 is coupled to the left front drive wheel 26 and operable to rotate the left front drive wheel 26 to propel the agricultural machine 20. The second drive pump 38 supplies pressurized fluid to a second hydraulic motor 42. The second hydraulic motor 42 is coupled to the right front drive wheel 28 and operable to rotate the right front drive wheel 28 to propel the agricultural machine 20.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Figure 2:
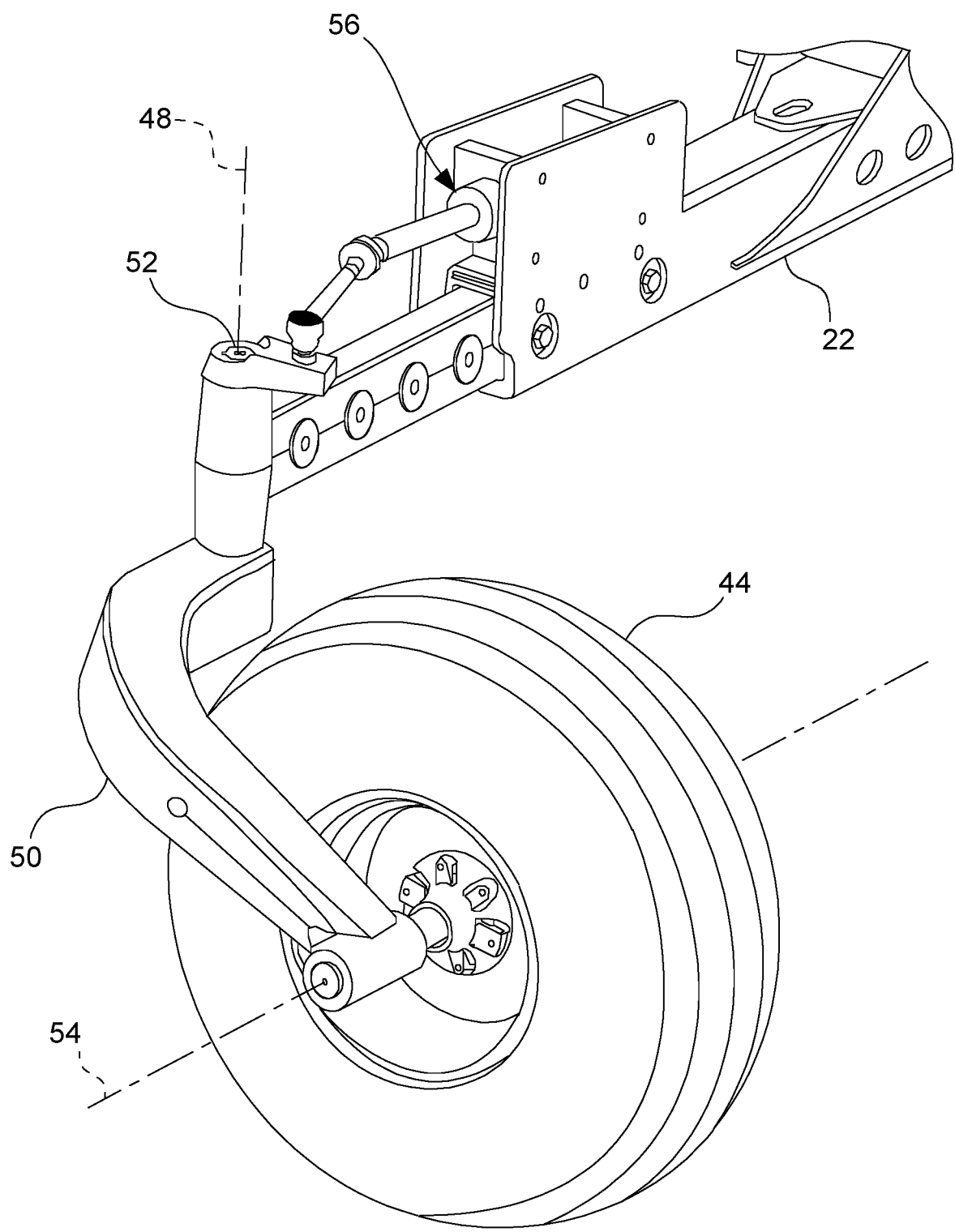
FIG. 2 is a schematic perspective view of a rear caster wheel of the agricultural machine.

Referring to FIGS. 1 and 2, the agricultural machine 20 further includes a left rear caster wheel 44 and a right rear caster wheel 46 attached to the frame 22. As used herein, the term "caster wheel" should be understood to include a wheel that is able to rotate a full three hundred sixty degrees (360°) about a respective generally vertical axis 48. As such, each of the left rear caster wheel 44 and the right rear caster wheel 46 are rotatable a full three hundred sixty degrees (360°) about a respective generally vertical axis 48. The left rear caster wheel 44 and the right rear caster wheel 46 may be attached to the frame 22 in a suitable manner. For example, as shown in FIG. 2, the caster wheels may be attached to the frame 22 via an arm 50. The arm 50 includes an upper shaft 52 that is rotatable about the generally vertical axis 48. The caster wheel is attached to lower distal end of the arm 50. Typically, a generally horizontal axis 54 of rotation of the wheel is longitudinally offset from the generally vertical axis 48, such that the caster wheel tends to follow behind the generally vertical axis 48. It should be appreciated that the right rear caster wheel 46 and the left rear caster wheel 44 may be attached to the frame 22 in some other manner than described herein.

Figure 3:
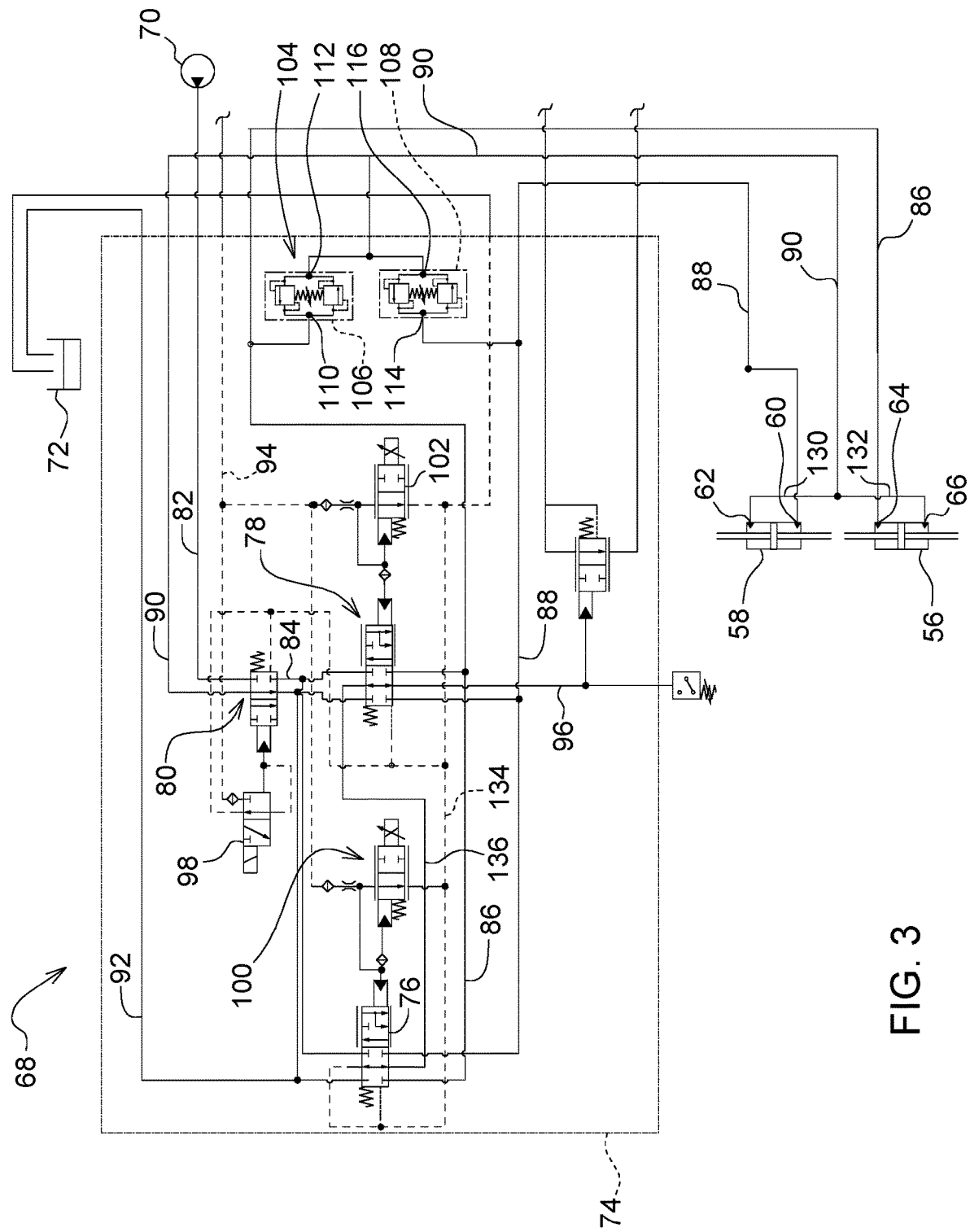
FIG. 3 is a schematic layout of a hydraulic system of the agricultural machine.

A left side actuator 56 interconnects the left rear caster wheel 44 and the frame 22, and is configured to control a position of the left rear caster wheel 44. Similarly, a right side actuator 58 interconnects the right rear caster wheel 46 and the frame 22, and is configured to control a position of the right rear caster wheel 46. In the example embodiment shown in FIG. 1 and described herein, each of the right side actuator 58 and the left side actuator 56 include a double acting hydraulic cylinder. As shown in FIG. 3, the right side actuator 58 includes an inboard port 60 and an outboard port 62 for receiving and/or discharging hydraulic fluid. Similarly, as shown in FIG. 3, the left side actuator 56 includes an inboard port 64 and an outboard port 66 for receiving and/or discharging hydraulic fluid.

The agricultural machine 20 includes a hydraulic system 68 for controlling the pair of steerable caster wheels, i.e., the left rear caster wheel 44 and the right rear caster wheel 46. While the left front drive wheel 26 and the right front drive wheel 28 provide the primary steering for the agricultural machine 20, the left rear caster wheel 44 and the right rear caster wheel 46 may be controlled to provide a steering assist and/or improve steering responsiveness under certain operating conditions. The hydraulic system connects the left side actuator 56 and the right side actuator 58 to provide a fluid tie rod therebetween. In other words, under certain operating conditions, the operation of the left rear caster wheel 44 and the right rear caster wheel 46 may be coupled together to provide a steering force to the agricultural machine 20, while in other operating conditions, the operation of the left rear caster wheel 44 and the right rear caster wheel 46 may be de-coupled to provide independent operation. Additionally, the hydraulic system 68 allows hydraulic forces applied to the left side actuator 56 and the right side actuator 58 to be overcome or overridden by forces applied to the left rear caster wheel 44 and the right rear caster wheel 46 by the ground.

The hydraulic system 68 includes a pressure source 70 configured to supply a flow of pressurized fluid. The pressure source 70 may include, but is not limited to, an auxiliary fluid pump that is drivenly coupled to the prime mover 24. The pressure source 70 draws fluid from a tank 72, and circulates the fluid through the hydraulic system 68. The tank 72 receives the fluid from the hydraulic system 68, stores the fluid, and supplies the fluid to the pressure source 70, e.g., an auxiliary fluid pump shown in FIG. 1.

Referring to FIG. 3, the hydraulic system 68 is shown schematically using standard American National Standards Institute (ANSI) hydraulic symbols to represent the various components of the example hydraulic system 68 therein. The hydraulic system 68 includes the pressure source 70 and the tank 72 described above, in combination with a valve block 74 and a plurality of fluid circuits described in greater detail below. It should be appreciated that the various fluid circuits described herein are defined fluid pathways or passages defined by the valve block 74, hard lines, flexible lines, fittings, connections, etc., that connect the various components and direct the fluid between components.

The valve block 74 includes a left steering command valve 76, a right steering command valve 78, and a rear steering control valve 80. A supply pressure fluid circuit 82 interconnects the pressure source 70 and the rear steering control valve 80 in fluid communication. A command valve supply fluid circuit 84 interconnects the rear steering control valve 80 with both the right steering command valve 78 and the left steering command valve 76 in fluid communication. A left side steering fluid circuit 86 interconnects the left side actuator 56 and the left steering command valve 76 in fluid communication. A right side steering fluid circuit 88 interconnects the right side actuator 58 and the right steering command valve 78 in fluid communication. A fluidic tie rod fluid circuit 90 interconnects both the left side actuator 56 and the right side actuator 58 with the rear steering control valve 80 in fluid communication. A tank return fluid circuit 92 interconnects the rear steering control valve 80, the left steering command valve 76, the right steering command valve 78, and the tank 72 in fluid communication. A pilot supply fluid circuit 94 is disposed in fluid communication with the left steering command valve 76, the right steering command valve 78, and the rear steering control valve 80. A pilot return fluid circuit 134 is disposed in fluid communication with the left steering command valve 76, the right steering command valve 78, the rear steering control valve 80, and the tank 72. A cross-valve fluid circuit 136 interconnects the left steering command valve 76 and the right steering command valve 78 in fluid communication. A pressure sensor fluid circuit 96 is disposed in fluid communication with the right steering command valve 78.

The rear steering control valve 80 is controllable between a first state and a second state. When the rear steering control valve 80 is disposed in the first state, the fluidic tie rod fluid circuit 90 and the tank return fluid circuit 92 are connected in fluid communication and the supply pressure fluid circuit 82 and the command valve supply fluid circuit 84 are disconnected from fluid communication. When the rear steering control valve 80 is disposed in the second state the fluidic tie rod fluid circuit 90 and the tank return fluid circuit 92 are disconnected from fluid communication and the supply pressure fluid circuit 82 and the command valve supply fluid circuit 84 are connected in fluid communication. The rear steering control valve 80 is normally disposed in the first state and is controlled into the second state in response to an activation signal. The activation signal causes the rear steering control valve 80 to move from the first state to the second state. In the absence of the activation signal, the rear steering control valve 80 returns to and/or maintains its position in the first state.

The activation signal for the rear steering control valve 80 may include an input that is capable of moving the rear steering control valve 80 from the first state into the second state. For example, the activation signal for the rear steering control valve 80 may include, but is not limited to, a fluid signal, a pneumatic signal, an electronic signal, a mechanical signal, etc. In the example embodiment shown in FIG. 3, the rear steering control valve 80 is a pilot actuated position control valve, in which a dedicated pilot valve 98 is disposed in fluid communication with the pilot supply fluid circuit 94 and is operable in response to an electronic signal to provide a hydraulic activation signal to the rear steering control valve 80 to move the rear steering control valve 80 from its first position to its second position. It should be appreciated that the rear steering control valve 80 and the manner of actuating the rear steering control valve 80 may differ from the example embodiment depicted in FIG. 3 and described herein.

As shown in the example embodiment of FIG. 3, the left steering command valve 76 may include a pilot actuated variable directional control valve. The left steering command valve 76 is moveable between a first state, a second state, and a plurality of positions between the first state and the second state. When the left steering command valve 76 is disposed in the first state, the left steering command valve 76 is configured to disconnect fluid communication between the left side steering fluid circuit 86 and the tank return fluid circuit 92, connect fluid communication between the pilot return fluid circuit 134 and the cross-valve fluid circuit 136, and disconnect fluid communication between the command valve supply fluid circuit 84 and the right side steering fluid circuit 88. When the left steering command valve 76 is disposed in the second state, the left steering command valve 76 is configured to connect fluid communication between the left side steering fluid circuit 86 and the tank return fluid circuit 92, close fluid communication to the pilot return fluid circuit 134, and connect fluid communication between the command valve supply fluid circuit 84, the right side steering fluid circuit 88, and the cross-valve fluid circuit 136. The left steering command valve 76 is normally disposed in the first state and is controlled into the second state or a position between the first state and the second state in response to a variable activation signal. The variable activation signal causes the left steering command valve 76 to move from the first state into the second state or to a desired position between the first state and the second state. In the absence of the activation signal, the left steering command valve 76 returns to and/or maintains its position in the first state.

The variable activation signal for the left steering command valve 76 may include an input that is capable of moving the left steering command valve 76 from the first state into the second state or to a position between the first state and the second state. For example, the variable activation signal for the left steering command valve 76 may include, but is not limited to, a variable fluid signal, a variable pneumatic signal, a variable electronic signal, a variable mechanical signal, etc. In the example embodiment shown in FIG. 3, the left steering command valve 76 is a variable pilot actuated variable position control valve, in which a dedicated variable pilot valve 100 is disposed in fluid communication with the pilot supply fluid circuit 94 and is operable in response to an electronic signal to provide a variable hydraulic activation signal to the left steering command valve 76 to move the left steering command valve 76 from its first position to its second position or a position between its first position and its second position. It should be appreciated that the left steering command valve 76 and the manner of actuating the left steering command valve 76 may differ from the example embodiment depicted in FIG. 3 and described herein.

As shown in the example embodiment of FIG. 3, the right steering command valve 78 may include a pilot actuated variable directional control valve. The right steering command valve 78 is moveable between a first state, a second state, and a plurality of positions between the first state and the second state. When the right steering command valve 78 is disposed in the first state, the right steering command valve 78 is configured to disconnect fluid communication between the right side steering fluid circuit 88 and the tank return fluid circuit 92, connect fluid communication between the cross-valve fluid circuit 136 and the pressure sensor fluid circuit 96, and disconnect fluid communication between the command valve supply fluid circuit 84 and the left side steering fluid circuit 86. When the right steering command valve 78 is disposed in the second state, the right steering command valve 78 is configured to connect fluid communication between the right side steering fluid circuit 88 and the tank return fluid circuit 92, disconnect fluid communication to the cross-valve fluid circuit 136, and connect fluid communication between the command valve supply fluid circuit 84, the left side steering fluid circuit 86, and the pressure sensor fluid circuit 96. The right steering command valve 78 is normally disposed in the first state and is controlled into the second state or a position between the first state and the second state in response to a variable activation signal. The variable activation signal causes the right steering command valve 78 to move from the first state into the second state or to a desired position between the first state and the second state. In the absence of the activation signal, the right steering command valve 78 returns to and/or maintains its position in the first state.

The variable activation signal for the right steering command valve 78 may include an input that is capable of moving the right steering command valve 78 from the first state into the second state or to a position between the first state and the second state. For example, the variable activation signal for the right steering command valve 78 may include, but is not limited to, a variable fluid signal, a variable pneumatic signal, a variable electronic signal, a variable mechanical signal, etc. In the example embodiment shown in FIG. 3, the right steering command valve 78 is a variable pilot actuated variable position control valve, in which a dedicated variable pilot valve 102 is disposed in fluid communication with the pilot supply fluid circuit 94 and is operable in response to an electronic signal to provide a variable hydraulic activation signal to the right steering command valve 78 to move the right steering command valve 78 from its first position to its second position or a position between its first position and its second position. It should be appreciated that the right steering command valve 78 and the manner of actuating the right steering command valve 78 may differ from the example embodiment depicted in FIG. 3 and described herein.

The hydraulic system 68 further includes a cross port pressure relief system 104 that interconnects the left side steering fluid circuit 86, the right side steering fluid circuit 88, and the fluidic tie rod fluid circuit 90 in fluid communication. As shown in the example embodiment of FIG. 3, the cross port pressure relief system 104 includes a left side pressure relief valve 106 and a right side pressure relief valve 108. The left side pressure relief valve 106 includes a first port 110 connected in fluid communication to the left side steering fluid circuit 86, and a second port 112 connected in fluid communication to the fluidic tie rod fluid circuit 90. The right side pressure relief valve 108 includes a first port 114 connected in fluid communication to the right side steering fluid circuit 88, and a second port 116 connected in fluid communication to the fluidic tie rod fluid circuit 90. The second port 112 of the left side pressure relief valve 106 and the second port 116 of the right side pressure relief valve 108 are both connected in fluid communication to each other, and to the fluidic tie rod fluid circuit 90. In the example shown in FIG. 3, the left side pressure relief valve 106 and the right side pressure relief valve 108 are disposed in the valve block 74. However, in other embodiments, the left side pressure relief valve 106 and the right side pressure relief valve 108 may be disposed in another or different valve body.

The left side pressure relief valve 106 and the right side pressure relief valve 108 provide two-way pressure relief. In other words, regardless of which direction the fluid pressure is applied from, i.e., from the first ports 110, 114 to the second ports 112, 116 respectively or from the second ports 112, 116 to the first ports 110, 114 respectively, the left side pressure relief valve 106 and the right side pressure relief valve 108 are configured to allow fluid communication when the applied fluid pressure is greater than a defined limit.

The left side steering fluid circuit 86 is disposed in fluid communication with the inboard port 64 of the left side actuator 56. A left side line 132 is disposed in fluid communication with the outboard fluid port 66 of the left side actuator 56. The right side steering fluid circuit 88 is disposed in fluid communication with the inboard port 60 of the right side actuator 58. A right side line 130 is disposed in fluid communication with the outboard fluid port 62 of the right side actuator 58. The right side line 130 and the left side line 132 are connected to each other and to the fluidic tie rod fluid circuit 90 in fluid communication.

The disclosure further includes a method of controlling the pair of steerable rear caster wheels of the agricultural machine 20, i.e., the left rear caster wheel 44 and the right rear caster wheel 46. The method includes providing the hydraulic circuit, such as described above. More specifically, the hydraulic circuit is provided to include the pressure source 70 configured to supply the flow of pressurized fluid, the tank 72 configured to receive the fluid and supply the fluid to the pressure source 70, the left side actuator 56 configured to control the left rear caster wheel 44, the right side actuator 58 configured to control the right rear caster wheel 46, the valve block 74 including the left steering command valve 76, the right steering command valve 78, and the rear steering control valve 80, the supply pressure fluid circuit 82 interconnecting the pressure source 70 and the rear steering control valve 80, the command valve supply fluid circuit 84 interconnecting the rear steering control valve 80 with both the right steering command valve 78 and the left steering command valve 76, the left side steering fluid circuit 86 interconnecting the left side actuator 56 and the left steering command valve 76, the right side steering fluid circuit 88 interconnecting the right side actuator 58 and the right steering command valve 78, the fluidic tie rod fluid circuit 90 interconnecting both the left side actuator 56 and the right side actuator 58 with the rear steering control valve 80, the tank return fluid circuit 92 interconnecting the rear steering control valve 80, the left steering command valve 76, the right steering command valve 78, and the tank 72, the pilot supply fluid circuit 94 in fluid communication with the left steering command valve 76, the right steering command valve 78, and the rear steering control valve 80, the pilot return fluid circuit 134 in fluid communication with the left steering command valve 76, the right steering command valve 78, the rear steering control valve 80, and the tank 72, the cross-valve fluid circuit 136 in fluid communication with the left steering command valve 76 and the right steering command valve 78, and the pressure sensor fluid circuit 96 in fluid communication with the right steering command valve 78.

The method further includes controlling the rear steering control valve 80 into its first state to provide passive control of the left rear caster wheel 44 and the right rear caster wheel 46. As described above, when the rear steering control valve 80 is disposed in its first state, the fluidic tie rod fluid circuit 90 and the tank return fluid circuit 92 are connected in fluid communication and the supply pressure fluid circuit 82 and the command valve supply fluid circuit 84 are disconnected from fluid communication. In the example embodiment described above, the rear steering control valve 80 is normally disposed in its first state. As such, the rear steering control valve 80 may be controlled in the first state by stopping the application of a current activation signal, or if no activation signal is currently being applied, by maintaining the lack of activation signal to the rear steering control valve 80.

The method further includes controlling the left steering command valve 76 into its respective second state, and the right steering command valve 78 into its respective second state. As described above, when the left steering command valve 76 is disposed in its second state, the left steering command valve 76 is configured to connect fluid communication between the left side steering fluid circuit 86 and the tank return fluid circuit 92, disconnect fluid communication between the pilot return fluid circuit 134 and the cross-valve fluid circuit 136, and connect fluid communication between the command valve supply fluid circuit 84, the right side steering fluid circuit 88, and the cross-valve fluid circuit 136. When the right steering command valve 78 is disposed in its second state, the right steering command valve 78 is configured to connect fluid communication between the right side steering fluid circuit 88 and the tank return fluid circuit 92, disconnect fluid communication between the cross-valve fluid circuit 136 and the pressure sensor fluid circuit 96, and connect fluid communication between the command valve supply fluid circuit 84, the left side steering fluid circuit 86, and the pressure sensor fluid circuit 96. In the example embodiment described above, the left steering command valve 76 and the right steering command valve 78 are normally disposed in their respective first state. As such, the left steering command valve 76 and the right steering command valve 78 may be controlled into their respective second state by applying a current activation signal to the left steering command valve 76 and the right steering command valve 78 respectively.

With the rear steering control valve 80 disposed in its first state, and the left steering command valve 76 and the right steering command valve 78 are disposed in their respective second states, the supply pressure fluid circuit 82 is disconnected from the command valve supply fluid circuit 84, such that no active steering controls may be applied to the left side actuator 56 and the right side actuator 58. Additionally, with the fluidic tie rod fluid circuit 90 and the tank return fluid circuit 92 connected in fluid communication, any fluid pressure in the fluidic tie rod fluid circuit 90 is free to dump to the tank 72. As such, the left rear caster wheel 44 and the right rear caster wheel 46 are free to rotate about their respective vertical axes 48 independent of each other, thereby allowing the agricultural machine 20 to execute a true spin turn around a fixed point. When disposed in this configuration, the left rear caster wheel 44 and the right rear caster wheel 46 do not provide substantial steering input, i.e., passive control.

With the rear steering control valve 80 disposed in its first state, the method may further include controlling each of the left steering command valve 76 and right steering command valve 78 to one or more positions between the first state and the second state of the left steering command valve 76 and the right steering command valve 78 respectively. This provides semi-passive proportional control of the left rear caster wheel 44 and the right rear caster wheel 46 respectively. In the example embodiment described above, the left steering command valve 76 and the right steering command valve 78 are normally disposed in their respective first state. As such, the left steering command valve 76 and the right steering command valve 78 may be controlled into a position between their respective first state and second state by applying a variable activation signal to the left steering command valve 76 and the right steering command valve 78 respectively.

The method may further include controlling the rear steering control valve 80 into its second state. As described above, when the rear steering control valve 80 is disposed in its second state, the rear steering control valve 80 disconnects fluid communication between the fluidic tie rod fluid circuit 90 and the tank return fluid circuit 92 and connects fluid communication between the supply pressure fluid circuit 82 and the command valve supply fluid circuit 84 to provide active control of the left rear caster wheel 44 and the right rear caster wheel 46. In the example embodiment described above, the rear steering control valve 80 is normally disposed in its first state. As such, the rear steering control valve 80 may be controlled into its second state by applying an activation signal to the rear steering control valve 80.

Once the rear steering control valve 80 is disposed in its second state, the method may further include controlling each of the left steering command valve 76 and right steering command valve 78 into variable positions between their respective first state and second state to provide active control of the left rear caster wheel 44 and the right rear caster wheel 46 respectively. In the example embodiment described above, the left steering command valve 76 and the right steering command valve 78 are normally disposed in their respective first state. As such, the left steering command valve 76 and the right steering command valve 78 may be controlled into a position between their respective first state and second state by applying a variable activation signal to the left steering command valve 76 and the right steering command valve 78 respectively.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hydraulic system for controlling a pair of steerable caster wheels of an agricultural machine, the hydraulic system comprising:
 a pressure source configured to supply a flow of pressurized fluid;
 a tank configured to receive the fluid and supply the fluid to the pressure source;
 a left side actuator configured to control a left rear caster wheel;
 a right side actuator configured to control a right rear caster wheel;
 a left steering command valve, a right steering command valve, and a rear steering control valve;
 a supply pressure fluid circuit interconnecting the pressure source and the rear steering control valve in fluid communication;

a command valve supply fluid circuit interconnecting the rear steering control valve with both the right steering command valve and the left steering command valve in fluid communication;
a left side steering fluid circuit interconnecting the left side actuator and the left steering command valve in fluid communication;
a right side steering fluid circuit interconnecting the right side actuator and the right steering command valve in fluid communication;
a fluidic tie rod fluid circuit interconnecting both the left side actuator and the right side actuator with the rear steering control valve in fluid communication;
a tank return fluid circuit interconnecting the rear steering control valve, the left steering command valve, the right steering command valve, and the tank in fluid communication;
a pilot supply fluid circuit in fluid communication with the left steering command valve, the right steering command valve, and the rear steering control valve;
a pilot return fluid circuit in fluid communication with the left steering command valve, the right steering command valve, the rear steering control valve, and the tank;
a cross-valve fluid circuit interconnecting the left steering command valve and the right steering command valve in fluid communication; and
wherein the rear steering control valve is a pilot actuated position control valve.

2. The hydraulic system set forth in claim 1, wherein the rear steering control valve is controllable between a first state in which the fluidic tie rod fluid circuit and the tank return fluid circuit are connected in fluid communication and the supply pressure fluid circuit and the command valve supply fluid circuit are disconnected from fluid communication, and a second state in which the fluidic tie rod fluid circuit and the tank return fluid circuit are disconnected from fluid communication and the supply pressure fluid circuit and the command valve supply fluid circuit are connected in fluid communication.

3. The hydraulic system set forth in claim 2, wherein the rear steering control valve is normally disposed in the first state and is controlled into the second state in response to an activation signal.

4. The hydraulic system set forth in claim 1, further comprising a cross port pressure relief system interconnecting the left side steering fluid circuit, the right side steering fluid circuit, and the fluidic tie rod fluid circuit in fluid communication.

5. The hydraulic system set forth in claim 4, wherein the cross port pressure relief system includes a left side pressure relief valve having a first port connected in fluid communication to the left side steering fluid circuit, and a second port connected in fluid communication to the fluidic tie rod fluid circuit.

6. The hydraulic system set forth in claim 5, wherein the cross port pressure relief system includes a right side pressure relief valve having a first port connected in fluid communication to the right side steering fluid circuit, and a second port connected in fluid communication to the fluidic tie rod fluid circuit.

7. The hydraulic system set forth in claim 6, wherein the second port of the left side pressure relief valve and the second port of the right side pressure relief valve are connected in fluid communication.

8. The hydraulic system set forth in claim 1, wherein the left side actuator includes an inboard fluid port and an outboard fluid port, and the right side actuator includes an inboard fluid port and an outboard fluid port.

9. The hydraulic system set forth in claim 8, wherein the left side steering fluid circuit is connected in fluid communication to the inboard fluid port of the left side actuator.

10. The hydraulic system set forth in claim 9, wherein the right side steering fluid circuit is connected in fluid communication to the inboard fluid port of the right side actuator.

11. The hydraulic system set forth in claim 10, wherein the outboard fluid port of the right side actuator and the outboard fluid port of the left side actuator are connected together and to the fluidic tie rod fluid circuit in fluid communication.

12. A hydraulic system for controlling a pair of steerable caster wheels of an agricultural machine, the hydraulic system comprising:
a pressure source configured to supply a flow of pressurized fluid;
a tank configured to receive the fluid and supply the fluid to the pressure source;
a left side actuator configured to control a left rear caster wheel;
a right side actuator configured to control a right rear caster wheel;
a left steering command valve, a right steering command valve, and a rear steering control valve;
a supply pressure fluid circuit interconnecting the pressure source and the rear steering control valve in fluid communication;
a command valve supply fluid circuit interconnecting the rear steering control valve with both the right steering command valve and the left steering command valve in fluid communication;
a left side steering fluid circuit interconnecting the left side actuator and the left steering command valve in fluid communication;
a right side steering fluid circuit interconnecting the right side actuator and the right steering command valve in fluid communication;
a fluidic tie rod fluid circuit interconnecting both the left side actuator and the right side actuator with the rear steering control valve in fluid communication;
a tank return fluid circuit interconnecting the rear steering control valve, the left steering command valve, the right steering command valve, and the tank in fluid communication;
a pilot supply fluid circuit in fluid communication with the left steering command valve, the right steering command valve, and the rear steering control valve;
a pilot return fluid circuit in fluid communication with the left steering command valve, the right steering command valve, the rear steering control valve, and the tank;
a cross-valve fluid circuit interconnecting the left steering command valve and the right steering command valve in fluid communication; and
wherein the left steering command valve is a pilot actuated variable directional control valve moveable between a first state and a second state, wherein the left steering command valve is configured to disconnect fluid communication between the left side steering fluid circuit and the tank return fluid circuit, connect fluid communication between the pilot return fluid circuit and the cross-valve fluid circuit, and disconnect fluid communication between the command valve supply fluid circuit and the right side steering fluid circuit when disposed in the first state, and wherein the left steering command valve is configured to connect the left side steering fluid circuit and the tank return fluid circuit in fluid communication, close fluid communication to the pilot return fluid circuit, and connect the command valve supply fluid circuit with both the right side steering fluid circuit and the cross-valve fluid circuit in fluid communication when disposed in the second state.

13. The hydraulic system set forth in claim 12, wherein the left steering command valve is normally disposed in the first state and is controlled into the second state in response to an activation signal.

14. A hydraulic system for controlling a pair of steerable caster wheels of an agricultural machine, the hydraulic system comprising:
- a pressure source configured to supply a flow of pressurized fluid;
- a tank configured to receive the fluid and supply the fluid to the pressure source;
- a left side actuator configured to control a left rear caster wheel;
- a right side actuator configured to control a right rear caster wheel;
- a left steering command valve, a right steering command valve, and a rear steering control valve;
- a supply pressure fluid circuit interconnecting the pressure source and the rear steering control valve in fluid communication;
- a command valve supply fluid circuit interconnecting the rear steering control valve with both the right steering command valve and the left steering command valve in fluid communication;
- a left side steering fluid circuit interconnecting the left side actuator and the left steering command valve in fluid communication;
- a right side steering fluid circuit interconnecting the right side actuator and the right steering command valve in fluid communication;
- a fluidic tie rod fluid circuit interconnecting both the left side actuator and the right side actuator with the rear steering control valve in fluid communication;
- a tank return fluid circuit interconnecting the rear steering control valve, the left steering command valve, the right steering command valve, and the tank in fluid communication;
- a pilot supply fluid circuit in fluid communication with the left steering command valve, the right steering command valve, and the rear steering control valve;
- a pilot return fluid circuit in fluid communication with the left steering command valve, the right steering command valve, the rear steering control valve, and the tank;
- a cross-valve fluid circuit interconnecting the left steering command valve and the right steering command valve in fluid communication; and
- wherein the right steering command valve is a pilot actuated variable directional control valve moveable between a first state and a second state, wherein the right steering command valve is configured to disconnect fluid communication between the right side steering fluid circuit and the tank return fluid circuit, connect fluid communication between the cross-valve fluid circuit and a pressure sensor fluid circuit, and disconnect fluid communication between the command valve supply fluid circuit and the left side steering fluid circuit when disposed in the first state, and wherein the right steering command valve is configured to connect the right side steering fluid circuit and the tank return fluid circuit in fluid communication, close fluid communication to the cross-valve fluid circuit, and connect the command valve supply fluid circuit with both the left side steering fluid circuit and the pressure sensor fluid circuit in fluid communication when disposed in the second state.

15. The hydraulic system set forth in claim 14, wherein the right steering command valve is normally disposed in the first state and is controlled into the second state in response to an activation signal.

16. A method of controlling a pair of steerable rear caster wheels of an agricultural machine, the method comprising:
providing a hydraulic circuit including:
- a pressure source configured to supply a flow of pressurized fluid;
- a tank configured to receive the fluid and supply the fluid to the pressure source;
- a left side actuator configured to control a left rear caster wheel;
- a right side actuator configured to control a right rear caster wheel;
- a left steering command valve, a right steering command valve, and a rear steering control valve;
- a supply pressure fluid circuit interconnecting the pressure source and the rear steering control valve in fluid communication;
- a command valve supply fluid circuit interconnecting the rear steering control valve with both the right steering command valve and the left steering command valve in fluid communication;
- a left side steering fluid circuit interconnecting the left side actuator and the left steering command valve in fluid communication;
- a right side steering fluid circuit interconnecting the right side actuator and the right steering command valve in fluid communication;
- a fluidic tie rod fluid circuit interconnecting both the left side actuator and the right side actuator with the rear steering control valve in fluid communication;
- a tank return fluid circuit interconnecting the rear steering control valve, the left steering command valve, the right steering command valve, and the tank in fluid communication;
- a pilot supply fluid circuit in fluid communication with the left steering command valve, the right steering command valve, and the rear steering control valve;
- a pilot return fluid circuit in fluid communication with the left steering command valve, the right steering command valve, the rear steering control valve, and the tank;
- a cross-valve fluid circuit interconnecting the left steering command valve and the right steering command valve in fluid communication;
- pressure sensor fluid circuit in fluid communication with the right steering command valve;
controlling the rear steering control valve into a first state in which the fluidic tie rod fluid circuit and the tank return fluid circuit are connected in fluid communication and the supply pressure fluid circuit and the command valve supply fluid circuit are disconnected from fluid communication to provide passive control of the left rear caster wheel and the right rear caster wheel; and
controlling each of the left steering command valve and right steering command valve into in a respective second state, wherein the left steering command valve is configured to connect fluid communication between the left side steering fluid circuit and the tank return fluid circuit, disconnect fluid communication between the pilot return fluid circuit and the cross-valve fluid circuit, and connect fluid communication between the command valve supply fluid circuit, the right side steering fluid circuit, and the cross-valve fluid circuit when disposed in the second state, and wherein the right steering command valve is configured to connect fluid communication between the right side steering fluid circuit and the tank return fluid circuit, disconnect fluid communication between the cross-valve fluid circuit and the pressure sensor fluid circuit, and connect fluid communication between the command valve supply fluid circuit, the left side steering fluid circuit, and the pressure sensor fluid circuit when disposed in the second state.

17. The method set forth in claim 16, further comprising controlling each of the left steering command valve and right steering command valve to one or more positions between a respective first state and their respective second state to provide semi-passive control of the left rear caster wheel and the right rear caster wheel respectively, wherein the right steering command valve is configured to disconnect fluid communication between the right side steering fluid circuit and the tank return fluid circuit, connect fluid communication between the cross-valve fluid circuit and the pressure sensor fluid circuit, and disconnect fluid communication between the command valve supply fluid circuit and the left side steering fluid circuit when disposed in the first state, and wherein the left steering command valve is configured to disconnect fluid communication between the left side steering fluid circuit and the tank return fluid, connect fluid communication between the pilot return fluid circuit and the cross-valve supply fluid circuit, and disconnect fluid communication between the command valve supply fluid circuit and the right side steering fluid circuit when disposed in the first state.

18. The method set forth in claim 16, further comprising controlling the rear steering control valve into a second state in which the fluidic tie rod fluid circuit and the tank return fluid circuit are disconnected from fluid communication and the supply pressure fluid circuit and the command valve supply fluid circuit are connected in fluid communication to provide active control of the left rear caster wheel and the right rear caster wheel.

19. The method set forth in claim 18, further comprising controlling each of the left steering command valve and right steering command valve into variable positions between a respective first state and a respective second state to provide active control of the left rear caster wheel and the right rear caster wheel respectively, wherein the left steering command valve is configured to disconnect fluid communication between the left side steering fluid circuit and the tank return fluid circuit, connect fluid communication between the pilot return fluid circuit and the cross-valve fluid circuit, and disconnect fluid communication between the command valve supply fluid circuit and the right side steering fluid circuit when disposed in the first state, wherein the left steering command valve is configured to connect the left side steering fluid circuit and the tank return fluid circuit in fluid communication, close fluid communication to the pilot return fluid circuit, and connect the command valve supply fluid circuit with both the right side steering fluid circuit and the cross-valve fluid circuit in fluid communication when disposed in the second state, wherein the right steering command valve is configured to disconnect fluid communication between the right side steering fluid circuit and the tank return fluid circuit, connect fluid communication between the cross-valve fluid circuit and the pressure sensor fluid circuit, and disconnect fluid communication between the command valve supply fluid circuit and the left side steering fluid circuit when disposed in the first state, and wherein the right steering command valve is configured to connect the right side steering fluid circuit and the tank return fluid circuit in fluid communication, close fluid communication to the cross-valve fluid circuit, and connect the command valve supply fluid circuit with both the left side steering fluid circuit and the pressure sensor fluid circuit in fluid communication when disposed in the second state.

* * * * *